United States Patent [19]

Tabuchi et al.

[11] Patent Number: 4,793,455

[45] Date of Patent: Dec. 27, 1988

[54] ELECTROMAGNETIC COUPLING

[75] Inventors: Yasuo Tabuchi, Kariya; Masao Nakano, Okazaki; Kichiro Kato, Susono; Tomoyuki Kurata, Yokohama, all of Japan

[73] Assignees: Nippondenso Co., Ltd., Kariya; Toyota Jidosha Kabushiki Kaisha, Toyota; Bridgestone Corporation, Tokyo, all of Japan

[21] Appl. No.: 80,007

[22] Filed: Jul. 31, 1987

[30] Foreign Application Priority Data

Aug. 1, 1986 [JP] Japan .............. 61-119053[U]

[51] Int. Cl.$^4$ .................. F16D 3/12; F16D 27/10
[52] U.S. Cl. .................. 192/84 C; 192/106.1; 464/89
[58] Field of Search .............. 192/84 C, 106.1, 30 V; 464/73, 74, 75, 76, 89, 92, 93

[56] References Cited

U.S. PATENT DOCUMENTS

| 2,065,601 | 12/1936 | Meyer . | |
|---|---|---|---|
| 2,142,784 | 1/1939 | Guy | 464/89 |
| 2,363,469 | 11/1944 | Goldschmidt | 464/75 |
| 3,774,739 | 11/1973 | Higuchi | 192/84 C |
| 4,432,446 | 2/1984 | Okano et al. | 192/84 C |
| 4,445,606 | 5/1984 | Van Laningham | 192/106.1 |
| 4,493,407 | 1/1985 | Newton | 192/84 C |
| 4,624,354 | 11/1986 | Koitabashi | 464/89 X |
| 4,718,526 | 1/1988 | Koitabashi | 464/89 X |

FOREIGN PATENT DOCUMENTS

| 2733880 | 2/1978 | Fed. Rep. of Germany ... 192/106.1 |
|---|---|---|
| 48-85048 | 10/1973 | Japan . |
| 49-89550 | 8/1974 | Japan . |
| 53-39822 | 9/1978 | Japan . |
| 55-123028 | 9/1980 | Japan . |
| 61-102298 | 6/1986 | Japan . |

Primary Examiner—Rodney H. Bonck
Attorney, Agent, or Firm—Cushman, Darby & Cushman

[57] ABSTRACT

An electromagnetic coupling selectively transmits power from an automobile engine to a supercharger. The electromagnetic coupling includes a rotor having excitation coils thereon and rotatable by the drive source, an armature magnetically attractable in a direction toward the rotor for rotation therewith in response to energization of the excitation coils, an outer holder plate mounted on the armature and having a first flange, an inner holder plate connected to the supercharger and disposed radially inwardly of the outer holder plate, the inner holder plate having a second flange positioned concentrically with and spaced from the first flange, and an elastomeric member disposed between and joined to the first and second flanges. The elastomeric member has a thickness in the direction toward the rotor which is progressively increased from the second flange toward the first flange. The elastomeric member has a surface remote from the armature, the surface and the first flange of the outer holder plate forming an obtuse angle before the armature is magnetically attracted to the rotor.

8 Claims, 5 Drawing Sheets

ELECTROMAGNETIC COUPLING

BACKGROUND OF THE INVENTION

The present invention relates to an electromagnetic coupling for selectively transmitting power to a supercharger in an automobile, for example, and more particularly to such an electromagnetic coupling for use as an electromagnetic clutch.

Some recent high-grade automobiles employ superchargers which are selectively driven by electromagnetic clutches when the rotational speed of the engine reaches a certain speed level. The electromagnetic clutch comprises a rotor having excitation coils and an annular armature which is movable toward and away from the rotor. An outer holder plate having a cross-shaped flange is attached to the armature. An inner holder plate similar in shape to the outer holder plate is disposed in the outer holder plate with an elastomeric member such as cushioning rubber member being interposed between the inner and outer holder plates. The inner holder plate is coupled to the compressor wheel of the supercharger through a rotatable drive shaft.

In operation, the excitation coils are energized to magnetically attract the armature to the rotor, so that rotation of the rotor can be transmitted through the outer holder plate, the cushioning rubber member, the inner holder plate, and the rotatable drive shaft to the compressor wheel of the supercharger. FIGS. 7(a) and 7(b) of the accompanying drawings show the manner in which the electromagnetic clutch operates. When the rotor magnetically attracts the armature, the outer holder plate a is moved in the direction of the arrow A with respect to the inner holder plate b, as shown in FIG. 7(a). Therefore, the cushioning rubber member c is elastically deformed such that it is inclined downwardly (FIG. 7(b)) in the direction from the inner holder plate b toward the outer holder plate a.

A portion of the cushioning rubber member c which is close to the outer holder plate a is subjected to a greater amount of elastic deformation per unit area than the other portion of the cushioning rubber member c. The cushioning rubber member c thus deformed is then subjected to twisting forces when the rotor is rotated. Therefore, the elasticity constant K (Kgm/deg) of the cushioning rubber member c in the direction in which it is twisted is progressively reduced as the elastic deformation D (mm) of the cushioning rubber member c increases across a gap region G and a joining region C. Each time the electromagnetic coupling is connected or the torque of the supercharger is varied, the cushioning rubber member c is twisted to a large degree. As a consequence, the cushioning rubber member c tends to deteriorate due to fatigue in a short period of time. Premature deterioration of the cushioning rubber member c results in an operation failure of the coupling and hence the supercharger connected to the coupling.

As shown in FIG. 7(b), when the outer holder plate a is moved toward the rotor, the cushioning rubber member c and the outer holder plate a form an acute angle R therebetween, causing stress concentration in a portion indicated by X. The stress concentration is apt to develop cracks in the cushioning rubber member c, with the result that the cushioning rubber member c will deteriorate soon.

SUMMARY OF THE INVENTION

In view of the aforesaid shortcomings of the conventional electromagnetic clutch, it is an object of the present invention to provide an electromagnetic coupling which includes an elastomeric member that has its elasticity constant kept substantially uniform and that is free from stress concentration, so that the elastomeric member will not be deteriorated soon, will provide a good damping action for a long period of time, and hence has a long service life, resulting in a prolonged operation capability of the coupling.

According to the present invention, an electromagnetic coupling for selectively transmitting power from a drive source to a driven member includes a rotor having excitation coils thereon and rotatable by the drive source, an armature movable toward and away from the rotor, the armature being magnetically attractable in a direction toward the rotor for rotation therewith in response to energization of the excitation coils, an outer holder plate mounted on the armature and having a first flange, an inner holder plate adapted to be connected to the driven member and disposed radially inwardly of the outer holder plate, the inner holder plate having a second flange positioned concentrically with and spaced from the first flange, and an elastomeric member disposed between and joined to the first and second flanges for transmitting the power from the outer holder plate through the elastomeric member to the inner holder plate upon energization of the excitation coils, the elastomeric member having a thickness in the direction which is progressively increased from the second flange toward the first flange, the elastomeric member having a surface remote from the armature, the surface and the first flange of the outer holder plate forming an obtuse angle before the armature is magnetically attracted to the rotor.

BRIEF DESCRIPTION OF THE DRAWINGS

The present invention will be described in detail by way of illustrative example with reference so the accompanying drawings, in which.

DETAILED DESCRIPTION

Figure 1B:
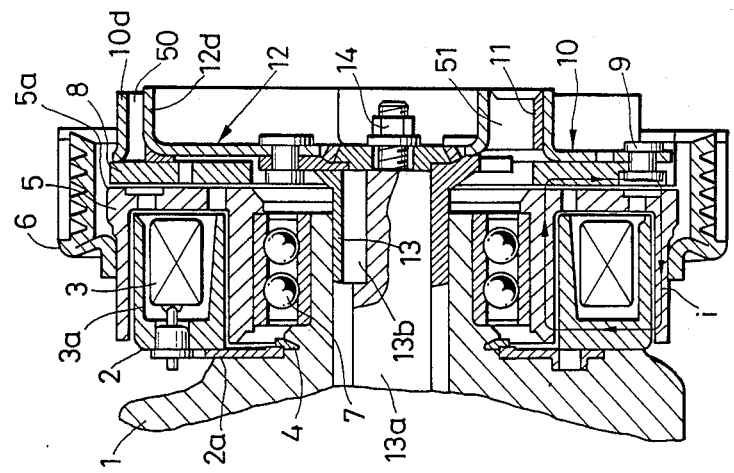
FIG. 1(b) is a cross-sectional view taken along line I-O-I of FIG. 1(a)

Like or corresponding parts are denoted by like or corresponding reference numerals throughout several views.

The principles of the present invention are particularly useful when embodied in an electromagnetic coupling such as an electromagnetic clutch for selectively transmitting engine power t a supercharger in an automobile. However, the present invention is also applicable to an electromagnetic coupling for selectively operating a compressor in an air-conditioning system or the like.

Figure 1A:
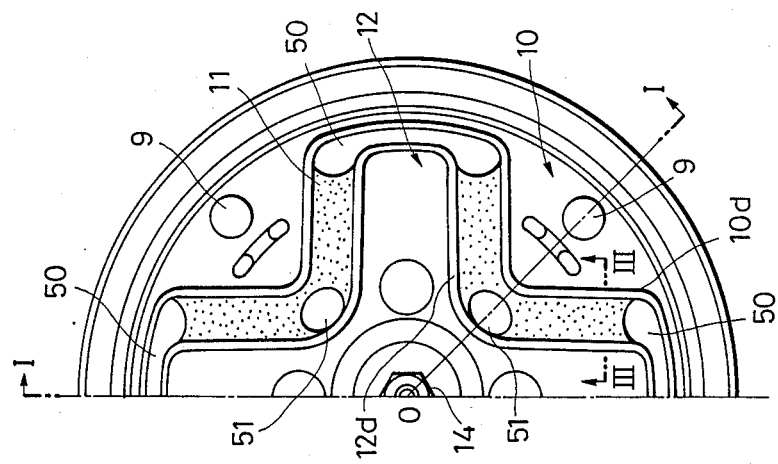
FIG. 1(a) is a fragmentary plan view showing one half of an electromagnetic coupling according to a first embodiment of the present invention.

FIGS. 1(a) and 1(b) show an electromagnetic clutch according to a first embodiment of the present invention.

Figure 2:
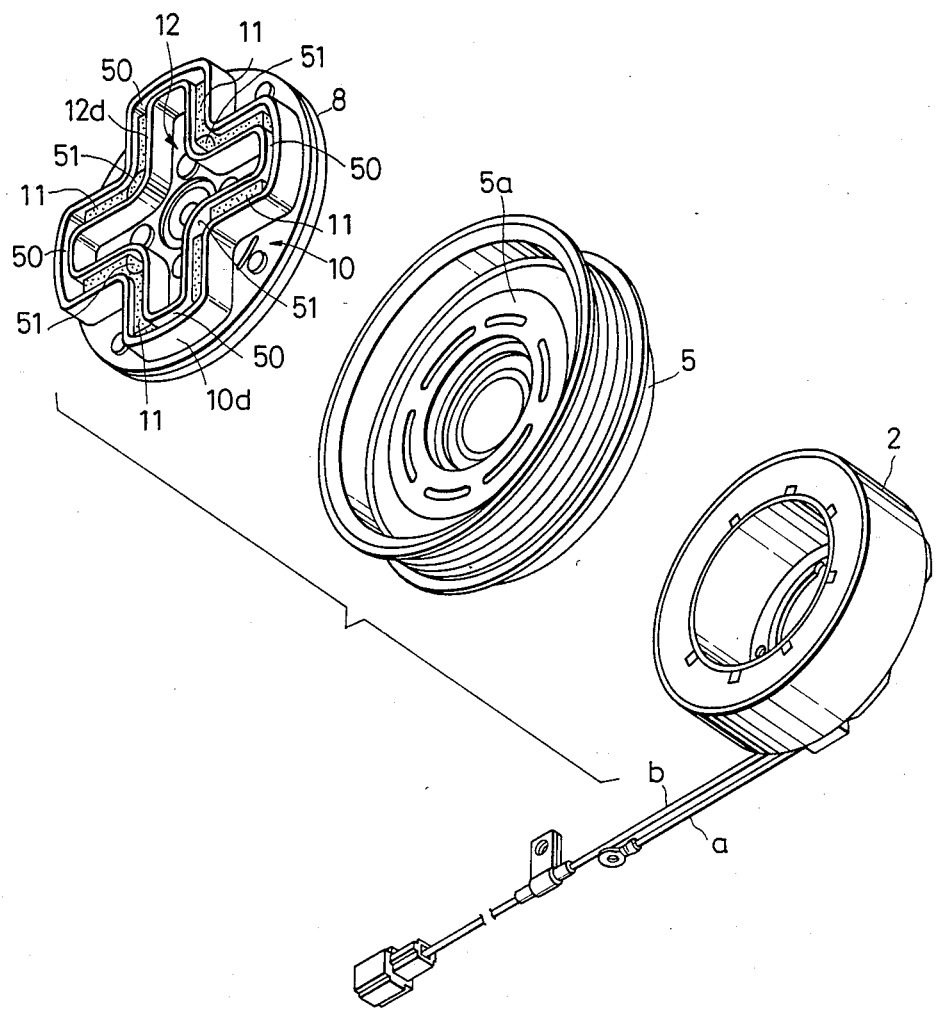
FIG. 2 an exploded perspective view of the electromagnetic coupling shown in FIGS. 1(a) and 1(b)

As shown in FIG. 1(b), a circular stator housing 2 houses therein excitation coils 3 wound in cylindrical shapes and disposed in respective coil casings 3a of a plastics material, the coil casings 3a being fixed to the stator housing 2 by staking. The excitation coils 3 are connected to an external power supply (not shown) through leads a, b as illustrated in FIG. 2. When the excitation coils 3 are energized, they produce magnetic circuits i as shown in FIG. 1(b).

An attachment flange 2a is joined to an axial end of the stator housing 2, and fixed to the supercharger housing 1 by means of a retaining ring 4. A rotor 5 is rotatably mounted on a boss of the housing 1 by a bearing 7. A pulley 6 is coupled by welding or the like to the outer periphery of the rotor 5. The rotor 5 has a friction surface 5a (see also FIG. 2) facing, and normally spaced from, an armature 8 to which an outer holder plate 10 is fixed by four angularly equally spaced rivets 9. Of course, more or less than four rivets 9 may be employed, and the rivets 9 may be angularly irregularly spaced. The outer holder plate 10 is coupled to an inner holder plate 12 through an elastomeric member 11 comprising a cushioning rubber member. The elastomeric member 11 may be of any of various other elastomeric materials other than rubber, which are capable of damping shocks applied therto.

The inner holder plate 12 is positioned radially inwardly of the outer holder plate 10. The outer holder plate 10 has a cross-shaped flange 10d, and the inner holder plate 12 also as a cross-shaped flange 12d which is similar in shape but smaller in size than the cross-shaped flange 10d. The flange 12d is disposed in concentric, spaced relation to the flange 10d with. The height of the flange 10d is larger than the height of the flange 12d. However, the flanges 10d, 12d may be of the same height.

Figure 3A:
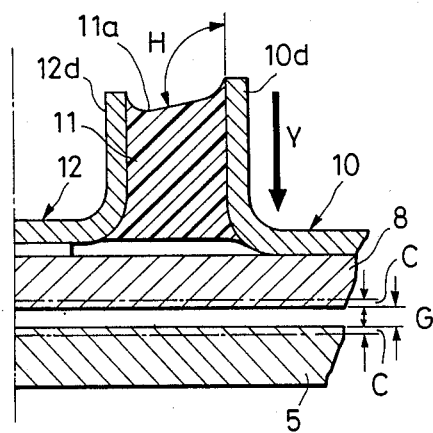
FIGS. 3(a) and 3(b) are cross-sectional views taken along line III—III of FIG. 1(a)

The cushioning rubber member 11 is positioned between and joined to the flanges 10d, 12d of the outer and inner holder plates 10, 12. The thickness of the cushioning rubber member 11 in a direction toward and away from the rotor 5, i.e., a vertical direction in FIG. 3(a), is progressively increased in a direction from the flange 12d toward the flange 10d. The cushioning rubber member 11 has an outer surface 11a remote from the armature 8, and the outer surface 11a and an inner surface of the flange 10d of the outer holder plate 10 form an obtuse angle H larger than 90 degrees therebetween before the armature 8 is magnetically attracted to the rotor 5, as described later. Between the flanges 10d, 12d, there are four cavities 50 positioned respectively at the distal ends of four arms of the cross-shaped outer and inner holder plates 10, 12, the cavities 50 being angularly spaced substantially 90 degrees.

The outer holder plate 10, the inner holder plate 12, and the cushioning rubber plate 11 are joined to each other as follows:

First, an adhesive is coated on the inner surface of the flange 10d of the outer holder plate 10 and the outer surface of the flange 12d of the inner holder plate 12. The flanges 10d, 12d with the adhesive coating applied thereto are then placed in a mold in spaced-apart relation to each other, and a mass of unvulcanized is filled between the flanges 10d, 12d. Then, the mold is clamped, and heated to vulcanize the rubber into the cushioning rubber member 11 of the given shape that is bonded to the flanges 10d, 12d.

The inner holder plate 12 is centrally fastened by a hexagonal nut 14 to a rotatable shaft 13a coupled to the compressor wheel (not shown) of a supercharger. The inner holder plate 12 has an integral hub 13 fitted over and secured to the rotatable shaft 13a by means of a key 13b or alternatively serrations or splines (not shown). The cushioning rubber member 11 has four holes 51 angularly spaced at about 90 degrees and disposed between the cavities 50 for releasing forces applied to the cushioning rubber member 11 to deform the same. The holes 51 may however be dispensed with.

The electromagnetic coupling of the above construction will operate as follows:

When the compressor of the supercharger is to be operated, the excitation coils 3 are energized to generate magnetic fluxes in the magnetic circuits i for thereby producing magnetic forces to attract the armature 8 to the rotor 5. As the armature 8 is magnetically attracted to the rotor 5, the armature 8 is moved axially with the outer holder plate 10 against the friction surface 5a of the rotor 5.

Since the rotor 5 is driven by an automobile engine (not shown) through the pulley 6 and belts (not shown), when the armature 8 is attracted to the rotor 5, driving power of the rotor 5 is transmitted to the armature 8 from which rotation is transmitted via the rivets 9, the outer holder plate 10, the cushioning rubber member 11, and inner holder plate 12, the hub 13, and the rotatable shaft 13a to the compressor wheel of the supercharger.

Before starting the supercharger, the inner and outer holder plates 12, 10 are at rest due to the load and inertial moment of the compressor wheel. When the armature 8 is coupled to the rotor 5 which is rotating, the cushioning rubber member 11 is subjected to an abrupt shock because of the driving power received by the outer holder plate 10 and the inertial moment of the inner holder plate 12 tending to be kept still. As a result, the cushioning rubber member 11 undergoes a twisting force tending to elastically deform the cushioning rubber member 11 in the direction in which it rotates. Upon connection between the armature 8 and the rotor 5, the outer holder plate 10 is moved in the direction of the arrow Y with respect to the inner holder plate 12 as shown in FIG. 3(a), and the cushioning rubber member 11 is elastically deformed as shown in FIG. 3(b).

According to the present invention, the thickness of the cushioning rubber member 11 in the axial direction of the rotor 5 and the armature 8 is progressively increased in the direction from the flange 12d toward the flange 10d, as described above. Therefore, a portion of the cushioning rubber member 11 which is close to the outer holder plate 10, i.e., its flange 10d, is not subjected to a greater amount of elastic deformation per unit area than the other portion of the cushioning rubber member 11. The elasticity constant of the cushioning rubber member 11 is thus prevented from being locally, reduced, i.e., remains substantially uniform.

Figure 3B:
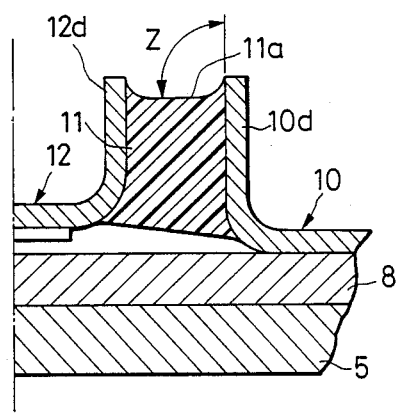

The increase in the thickness of the cushioning rubber member 11 at its area joined to the flange 10d is substantially equal to the interval or distance by which the armature 8 and hence the inner holder plate 10 can move toward the rotor 5 from the position of FIG. 3(a) to the position of FIG. 3(b).

Figure 4:
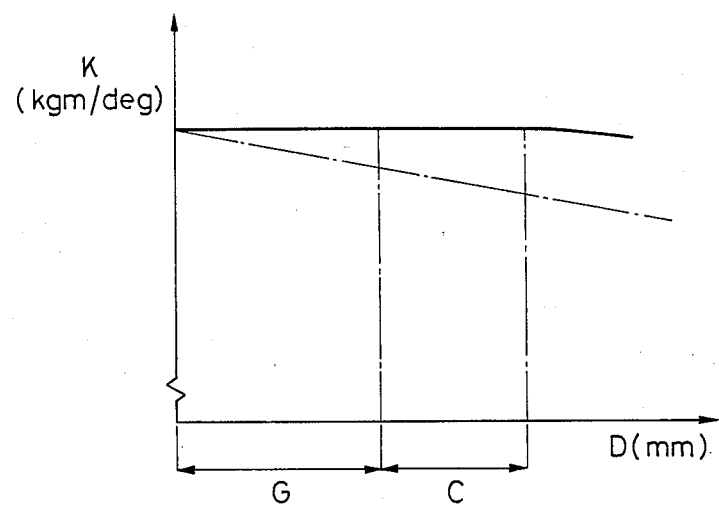
FIG. 4 is a graph showing the relationship between the elasticity constant K and the deformation D of an elastomeric member in the electromagnetic coupling.

FIG. 4 shows the elasticity constant K (Kgm/deg) of the cushioning rubber member 11, represented on a vertical axis and plotted against the amount of elastic deformation D (mm) that is represented on a horizontal axis. It is apparent from FIG. 4 that the elasticity constant K indicated by the solid line remains substantially uniform irrespective of the amount of elastic deformation D across a gap region G and a joining region C. Consequently, the cushioning rubber member 11 is resistant to fatigue-induced deterioration and keeps its damping effect over a long period of time. When the cushioning rubber member 11 is elastically deformed, the angle Z formed between the outer surface 11a of the cushioning rubber member 11 and the outer surface of the flange 10d remains relatively large, preventing stresses from concentrating in the cushioning rubber member 11. For the above reasons, the cushioning rubber member 11 will not be deteriorated soon and will not be cracked due to stress concentration. The cushioning rubber member 11 can thus be used for a prolonged period of time, or has a long service life, and remains highly durable.

When the excitation coils 3 are de-energized, the armature 8 is resiliently moved out of frictional contact with the friction surface 5a of the rotor 5 under the resilient force of the cushioning rubber member 11. The electromagnetic clutch is thus disconnected, and the supercharger is stopped in its operation.

Figure 5:
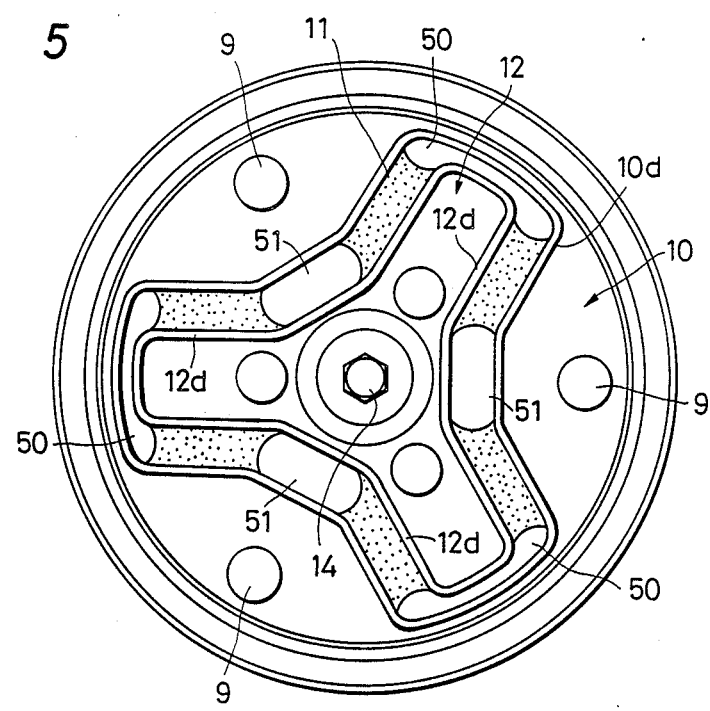
FIG. 5 is a plan view of an electromagnetic coupling according to a second embodiment of the present invention.
Figure 6:
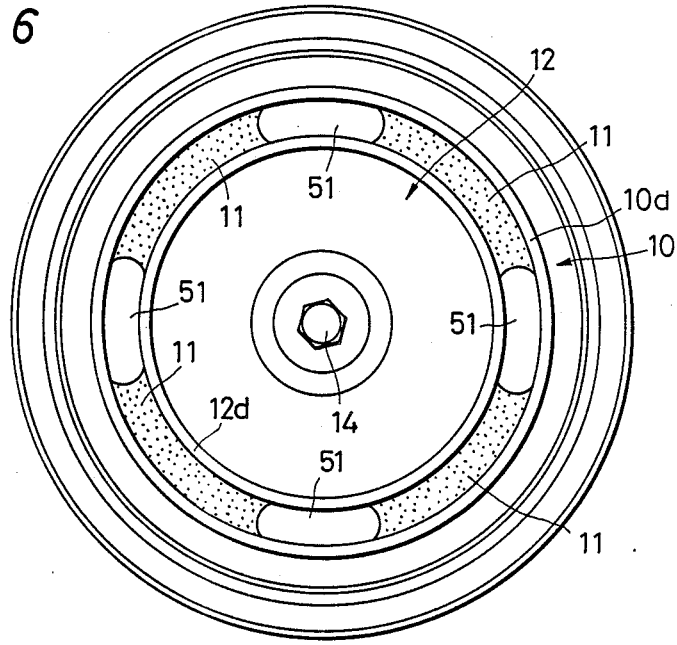
FIG. 6 is a plan view of an electromagnetic coupling according to a third embodiment of the present invention.
Figure 7A:
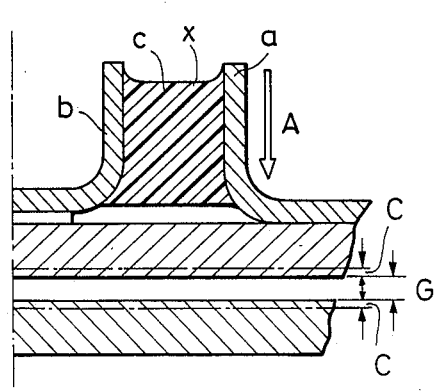
FIGS. 7(a) and 7(b) are cross-sectional views of a portion of a conventional electromagnetic coupling.
Figure 7B:
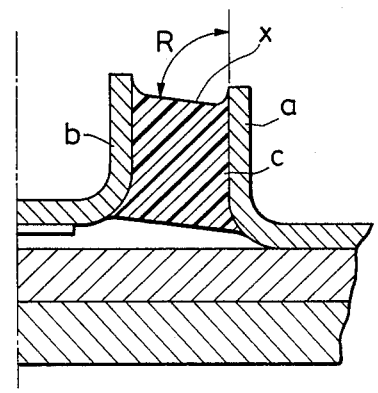
Figure 8:
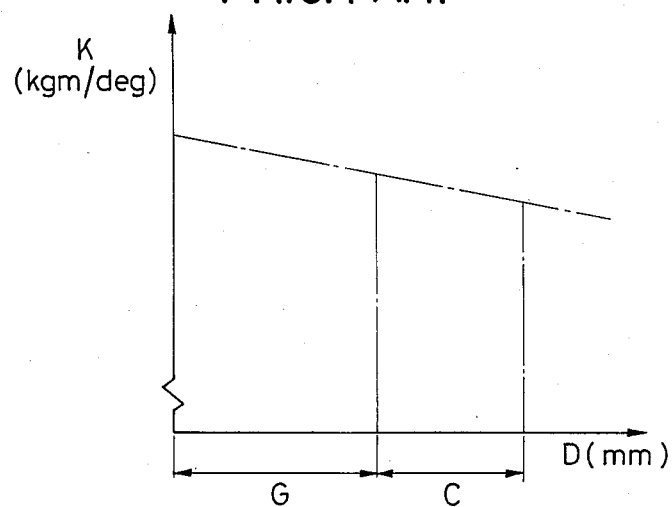
FIG. 8 is a graph showing the relationship between the elasticity constant K and the deformation D of an elastomeric member in the conventional electromagnetic coupling.

FIG. 5 shows an electromagnetic clutch according to a second embodiment of the present invention.

The electromagnetic coupling shown in FIG. 5 differs from that of the first embodiment in that inner and outer holder plates 12, 10 have generally Y-shaped flanges 12d, 10d, respectively.

According to a third embodiment of the present invention, inner and outer holder plates 12, 10 have annular flanges 12d, 10d respectively.

Although certain preferred embodiments of the present invention have been shown and described in detail, it should b understood that various changes and modifications may be made therein without departing from the scope of the appended claims.

We claim:

1. An electromagnetic coupling for selectively transmitting power from a drive source to a driven member, comprising:
   a rotor having excitation coils thereon and rotatable by the drive source;
   an armature movable toward and away from said rotor, said armature being magnetically attractable in a direction toward said rotor for rotation therewith in response to energization of said excitation coils;
   an outer holder plate mounted on said armature and having a first flange;
   an inner holder plate adapted to be connected to the driven member and disposed radially inwardly of said outer holder plate, said inner holder plate having a second flange positioned concentrically with and spaced from said first flange; and
   an elastomeric member disposed between and joined to said first and second flanges for transmitting the power from said outer holder plate through said elastomeric member to said inner holder plate upon energization of said excitation coils, said elastomeric member having a thickness in said direction which is progressively increased from said second flange toward said first flange, said elastomeric member having a surface remote from said armature, said surface and said first flange of the outer holder plate forming an obtuse angle before said armature is magnetically attracted to said rotor.

2. An electromagnetic coupling according to claim 1, wherein each of said first and second flanges is cross-shaped.

3. An electromagnetic coupling according to claim 1, wherein each of said first and second flanges is substantially Y-shaped.

4. An electromagnetic coupling according to claim 1, wherein each of said first and second flanges is annular in shape.

5. An electromagnetic coupling according to claim 1, wherein the increase in the thickness of said elastomeric member in an area thereof which is joined to said first flange is substantailly equal to the interval by which said armature can move toward said rotor under magnetic attraction.

6. An electromagnetic coupling according to claim 1, wherein said first flange extends further in an axial direction of the armature than said second flange.

7. An electromagnetic coupling according to claim 1, wherein there are a plurality of angularly spaced cavities defined between said first and second flanges.

8. An electromagnetic coupling according to claim 7, wherein said elastomeric member has a plurality of angularly spaced holes disposed between said cavities for releasing forces applied to said elastomeric member to deform the same.

* * * * *